FIG.2
FIG.2a
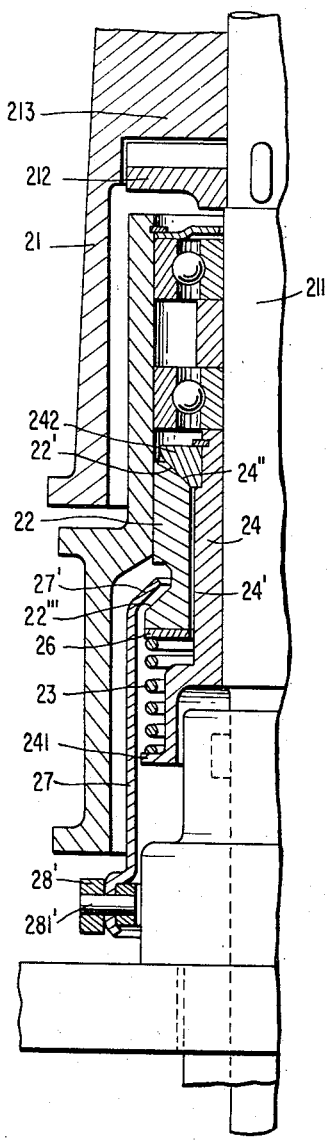
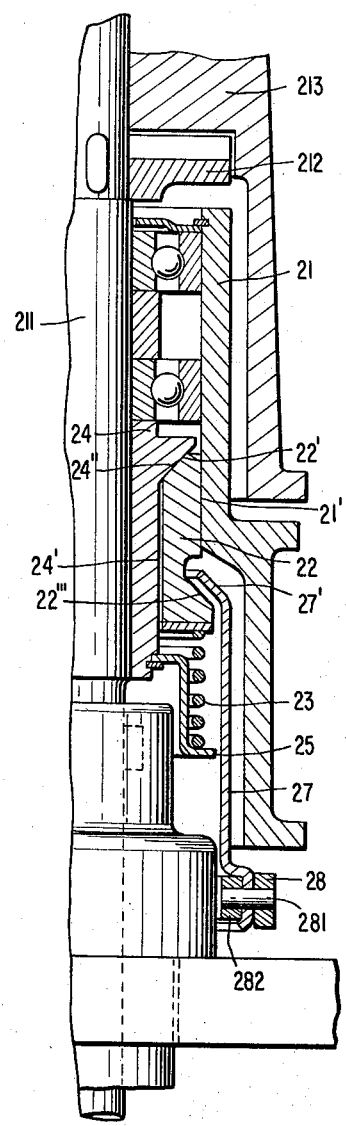
INVENTORS
HANS STAHLECKER
SIGMUND KEMMLER
BY Craig & Antonelli
ATTORNEYS March 19, 1968     H. STAHLECKER ET AL     3,373,556
SPINDLES FOR TEXTILE MACHINES Filed July 12, 1965     5 Sheets-Sheet 3

INVENTORS
HANS STAHLECKER
SIGMUND KEMMLER

BY *Craig & Antonelli*

ATTORNEYS

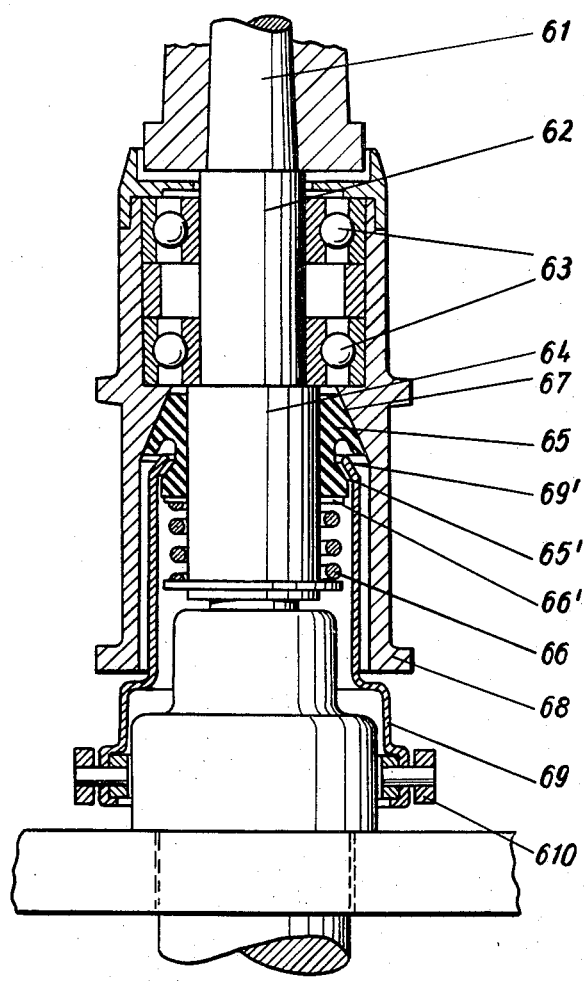

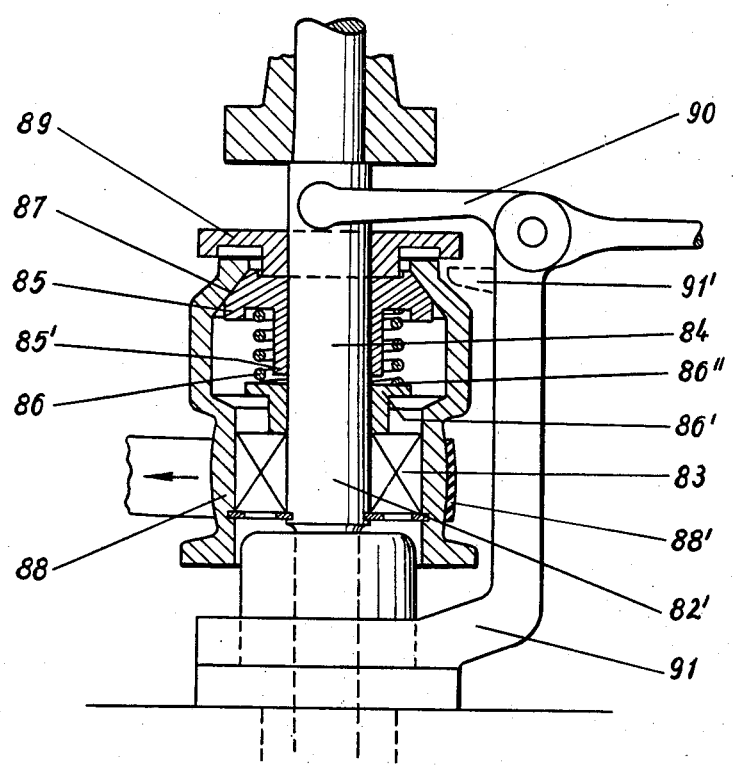

United States Patent Office 3,373,556
Patented Mar. 19, 1968

3,373,556
SPINDLES FOR TEXTILE MACHINES
Hans Stahlecker, Sussen, Wurttemberg, and Sigmund Kemmler, Geislingen, Steige, Wurttemberg, Germany, assignors to Spindelfabrik Sussen, Schurr, Stahlecker & Grill G.m.b.H., Sussen, Wurttemberg, Germany
Filed July 12, 1965, Ser. No. 479,989
Claims priority, application Germany, July 14, 1964, S 92,039; June 1, 1965, S 97,407
13 Claims. (Cl. 57—88)

ABSTRACT OF THE DISCLOSURE

A stop spindle whose acceleration during the starting and whose retardation during the braking is limited so that the yarn body is protected. Between the wharve and a clutch member fixed on a shaft is a spring biased clutch element. The clutch element, which is either radially elastic or divided into radially moveable segments, is wedged in, during the operation of the spindle and the axially directed spring action, between the wharve and the clutch member secured to the spindle shaft. An upwardly conically extending sleeve engages in an annular groove of the clutch element to stop the spindle. The lower flank or side of the annular groove is adapted to the conical shape of the sleeve. When stopping, the sleeve is moved downwardly, the friction contact between the wharve and the clutch element is dissolved, and the clutch element is wedged in between the conical part of the sleeve and the clutch member under the action of the spring. In view of the fact that there is no rigid connection between either the wharve and the clutch element or between the clutch element and the clutch member secured to the shaft so that merely a frictional connection is provided, the spindle is braked softly and is equally softly brought again to speed; this soft operation and action primarily being due to the spring tension of the axially acting spring as well as the radially elastic and freely rotatable arrangement of the clutch element. The object sought to be obtained with the present invention is achieved by means of the provision of the clutch element, which is radially elastic or divided into segments and which is subjected to the action of an axially pressing spring while not being hindered in the free play thereof by wedges or the like.

---

It is a fact well-known in the art that spindles which are intended for carrying considerable weights as required, for example, in spinning and twisting machines, winding machines, or the like cannot be stopped properly merely by means of a brake. It is therefore conventional to drive such a spindle by means of a loose wharve which is freely rotatable on the spindle shaft or on a part which is rigidly secured to this shaft and to provide suitable releasable clutch means for connecting this wharve to the spindle shaft so as to drive the same. These clutch means for such so-called stop spindles have in the past been provided in the form of centrifugal clutches, jaw clutches, friction clutches with level surfaces, or clutches which are provided with rings with a conical bore or with rings with a conical outer surface. All of these clutches, however, had the disadvantage that they either became worn too quickly or that their manufacture was too expensive.

These known clutches for spindles have the further disadvantage that they do not permit the spindle to be stopped gradually and smoothly. Such a smooth braking action is very desirable since there is otherwise considerable danger that the windings on a yarn cap which is carried by the spindle will be shifted relative to each other. Still another disadvantage of these known clutch means is the fact that the force which has to be applied for stopping the spindle depends upon the manipulation by the operator and that it may therefore occur that the brake will be applied with an excessive force.

It is therefore an object of the present invention to provide a clutch and brake mechanism for a textile spindle which overcomes the above-mentioned disadvantages and the difficulties which previously occurred when the loose wharve was to be connected to the spindle so as to drive the same. This object is attained according to the invention by providing a clutch element which is yieldable in radial directions and acted upon by at least one spring in the axial direction of the spindle, and by providing suitable means for clamping the loose wharve together with the associated clutch member or "fixed wharve" which is rotatable with the spindle shaft by the wedging action of the clutch element.

The radially releasable clutch element according to the invention may either consist of a resilient material or, according to one preferred embodiment of the invention, of a slotted resilient ring. Very important advantages may be attained if the slots are cut entirely through the clutch ring so as to divide it into at least three radially movable segments. These segments are preferably prevented from being pressed against each other by being separated by projections which are provided on their support. For clamping the loose wharve together with the fixed wharve on the spindle shaft, the coupling element is preferably provided with a conical outer clutch surface and with a cylindrical inner clutch surface. A coupling element of this type of construction may be easily manufactured and its operation is very efficient and reliable.

Since the manner of securing a separate wharve member to the spindle shaft may impair the operating characteristics and trueness of the spindle, which would be of disadvantage especially if this spindle is to be driven at a high speed, it is advisable to provide this fixed wharve member against which the inner surface of the clutch element is to be clamped as an integral part of the spindle shaft. This has also the advantage that the diameter of the fixed wharve member may be reduced and that the cost of manufacture of the entire spindle structure will also be reduced. It is then not only possible, but even of advantage if the part of the spindle shaft which is to be clamped together with the clutch element is made of an outer diameter equal to that of the part of the shaft on which the bearing or bearings for the loose wharve are mounted. For spindles which are driven in a particular manner, it is also of advantage if the part of the spindle shaft which is to be clamped together with the clutch element is provided above the bearings for the loose wharve.

The above-mentioned as well as numerous other features and advantages of the present invention will become further apparent from the following detailed description thereof which is to be read with reference to the accompanying drawings, in which—

FIGURE 1a shows a top view of the clutch segments according to FIGURE 1;

FIGURE 2 shows a longitudinal section parallel to the spindle rail of the wharve part of a stop spindle which is provided with axially movable clutch elements with conical inner clutch surfaces and cylindrical outer clutch surfaces, and it also shows a fixed wharve member with a separate conical ring;

FIGURE 2a shows a longitudinal section similar to FIGURE 2 with a fixed wharve member which has a conical surface integrally thereon;

FIGURE 4 shows a partial longitudinal section of a spindle, the clutch element of which is adapted to clamp the loose wharve upon a part of the spindle shaft of a larger diameter;

FIGURE 5 shows a partial longitudinal section of a spindle, the clutch element of which is mounted above the bearing for the loose wharve.

Figure 1:
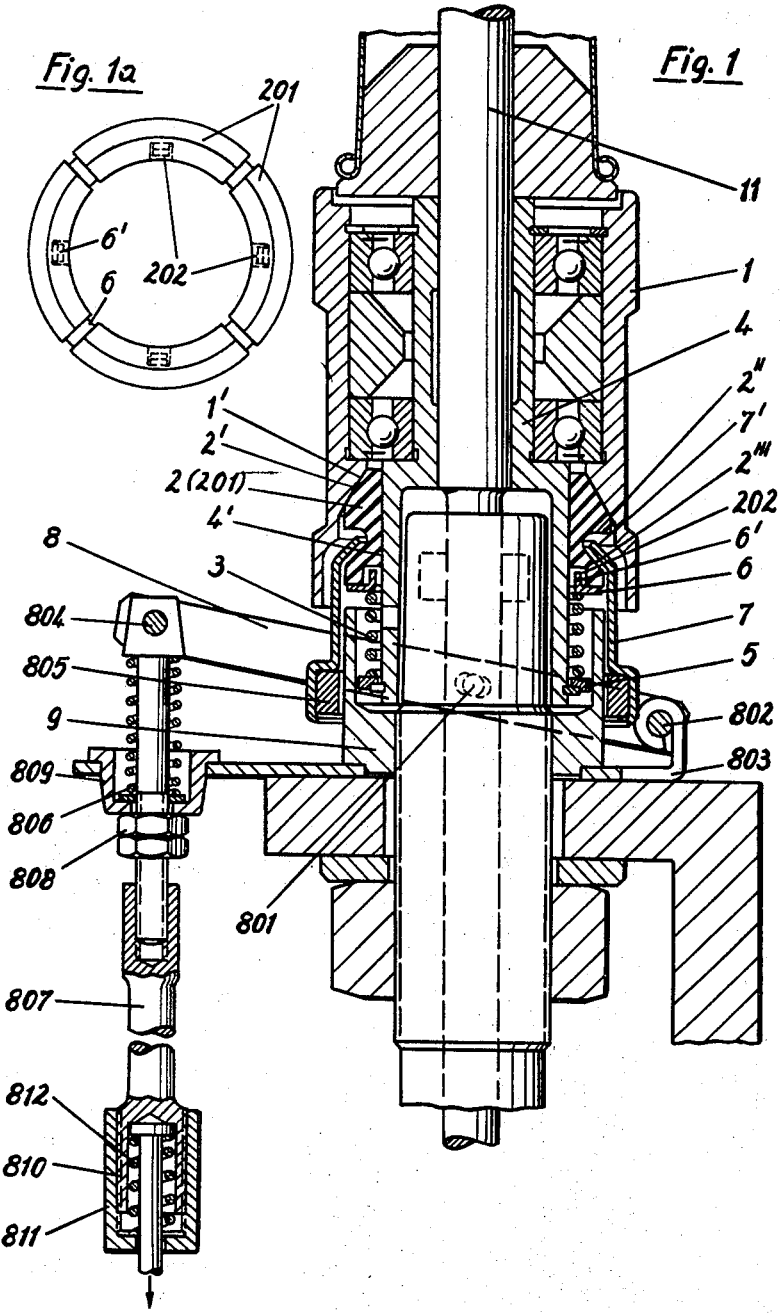
FIGURE 1 shows a longitudinal section which is taken transversely to the spindle rail of the wharve part of a stop spindle which is provided with an axially movable clutch element consisting of several segments which have cylindrical inner clutch surfaces and conical outer clutch surfaces.

Referring first particularly to FIGURE 1, the loose wharve 1 which may be driven by a belt, not shown, is provided with a conical bore forming an inner clutch surface 1', while the movable clutch element 2 consists of four segments 201 which are provided with conical outer surfaces 2' of an angularity corresponding to that of the inner conical surface 1' of the wharve 1. A spring 3 tends to press the clutch segments 201 upwardly into the conical bore 1'. The radially acting components of the force which is produced by spring 3 on the conical surfaces 1' and 2 press the clutch segments at 4' against a wharve member 4 hereafter called the "fixed wharve" member which is rigidly secured to the center shaft 11 whereby the loose wharve 1 is clamped together with the fixed wharve member 4 by the wedging action of the clutch element 2. The lower end of spring 3 is supported on a ring 5 which is secured to the lower end of the wharve member 4. Due to the fact that spring 3 which acts upon the fixed wharve member 4 is mounted in a position underneath the clutch element 2, the clutch mechanism requires very little space. The washer 6 which is acted upon by spring 3 and on which, in turn, the clutch segments 201 are supported is provided with projections 6' which engage into recesses 202 in segments 201 (FIGURE 1a) and thereby prevent the clutch segments from shifting laterally on the surface of washer 6. Clutch element 2 is provided with an annular groove 2" which has a conical lower side wall 2'" and into which the conical upper end 7' of a slidable sleeve 7 engages. If the spindle is to be stopped, a lever 8 which is pivotably connected to the opposite sides of sleeve 7 at 801 is actuated by hand or by foot so as to move this sleeve downwardly. The conical part 7' of sleeve 7 thereby engages with the conical side wall 2'" of the clutch element 2 and when sleeve 7 is moved further downwardly, the conical clutch surface 2' disengages from the conical surface 1' of wharve 1. However, since spring 3 then presses the conical part 7' into engagement with the conical side wall 2'" and thereby produces a force component which is acting in a radially inward direction, segments 2, 201 remain in frictional engagement with the spindle shaft 11 at 4' for effecting a braking action. The frictional engagement between the clutch element 2 and the fixed wharve member 4 may be made either looser or tighter and the braking effect may accordingly be made more gentle or harder depending upon the particular angle of the conical side wall 2'" and the conical part 7' of sleeve 7. The operating position of lever 8 which is pivotably connected by the pivot pin 802 to one end of a bracket 803 and thus the operating position of the slidable sleeve 7 is adjustable by the nuts 808 on the upper part of the connecting rod 807, and the particular adjustment is maintained by a spring 806 which acts upon a flange on the upper part of the control rod 807 and thereby presses the same toward the spring cup 809 which is inserted in and secured to the other end of bracket 803. If the nuts 808 are properly adjusted, the conical part 7' of sleeve 7 will not engage in the operating position with either of the side walls of groove 2". In order to insure that, when the brake is applied, the side wall 2'" of the clutch element 2 will engage with the conical part 7' of sleeve 7, and the clutch element will engage with the cylindrical part 4' of the fixed wharve member 4 only with certain maximum force so that no inadmissible braking pressure exceeding this force may be produced by the control rod 807, the latter may be equipped with a resilient element 810 which may be either adjustable or nonadjustable and serves as an overload protection. In the particular embodiment of the invention as illustrated in FIGURE 1, this overload protection consists of a coil spring 812 which is adjustable by a threaded sleeve 811.

According to the modification of the invention as illustrated in FIGURES 2 and 2a, the clutch element 22 is provided with an inner conical clutch surface 22'. Under the action of spring 23 which is either supported on a flange 241 of the wharve member 24 which is fixed to the spindle shaft, as shown at FIGURE 2, or on a separate tubular member 25 which is secured to the fixed wharve 24, as shown at FIGURE 2a, the clutch element 22 is pressed via a pressure ring 26 against the conical surface 24" of the fixed wharve member 24. The radial components of the spring force which are produced by these conical clutch surfaces press the circular cylindrical outer surface of the clutch element 22 also against the wall of the cylindrical bore 21' of the loose wharve 21 so that the latter is clamped by the clutch element 22 together with the fixed wharve member 24. The frictional engagement between the loose wharve 21 and the clutch element 22 is further increased by the centrifugal forces which then occur. For unclutching and braking the loose wharve, the slidable sleeve 27 is moved downwardly so that the conical part 27' thereof will engage with the conical side wall 22'" of the annular groove in the clutch element 22. When the conical surface 22' of the clutch element 22 has disengaged from the clutch surface 24" of the fixed wharve member 24, the radial forces which are inwardly directed and are produced by the action of the conical surfaces 27' and 22'" upon each other press the radially movable segments of the clutch element 22 against the cylindrical outer surface 24' of the fixed wharve member 24 and thereby start the braking operation. The movement of the slidable sleeve 27 is produced similarly as in the embodiment according to FIGURE 1 by means of a bifurcated lever 28, 28' which is pivotably connected by the pivot pins 281 and 281' to a ring 282 which is secured to sleeve 27. The question as to whether the fixed wharve member 24 should be made of the construction as shown at FIGURE 2 or of the construction as shown at FIGURE 2a depends to some extent upon the particular manner in which the entire structure is to be assembled. On FIGURE 2, the clutch surface 24" is provided on a separate conical ring 242 which is removably secured to the fixed wharve member 24, and the installation and removal of the clutch element 22 together with the slidable sleeve 27 is therefore carried out from above. On FIGURE 2a, the tubular supporting member 25 is removably secured to the wharve member 24 so that the installation and removal of the clutch element 22 together with the slidable sleeve 27 may be carried out from below. Whether one or the other construction is more suitable depends upon the manner of mounting the loose wharve 21 and upon the arrangement of the parts which are mounted on the spindle shaft 211 for receiving the cops or bobbin cases, for example, the drive member 212, the carrier 213, etc.

Figure 3:
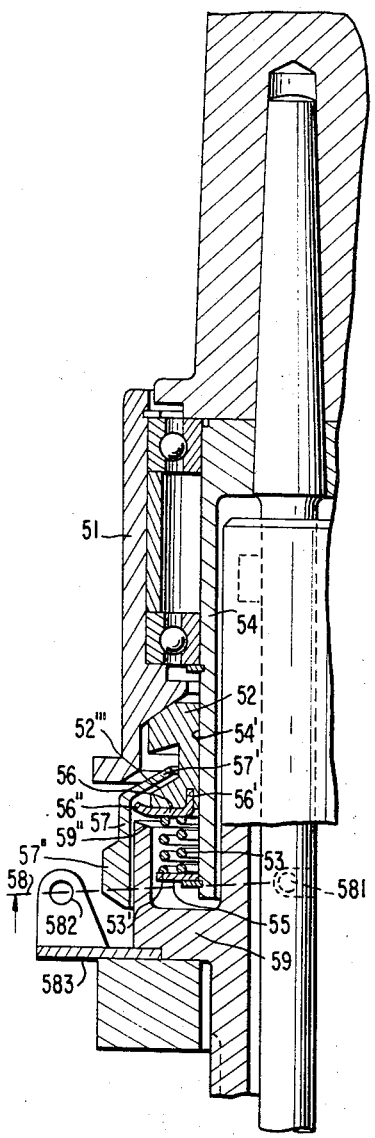
FIGURES 3 and 3a show longitudinal sections which are taken transversely to the spindle rails of the wharve part of stop spindles similar to that as shown in FIGURE 1, but provided with two springs and an additional brake surface on the housing flange.
Figure 3A:
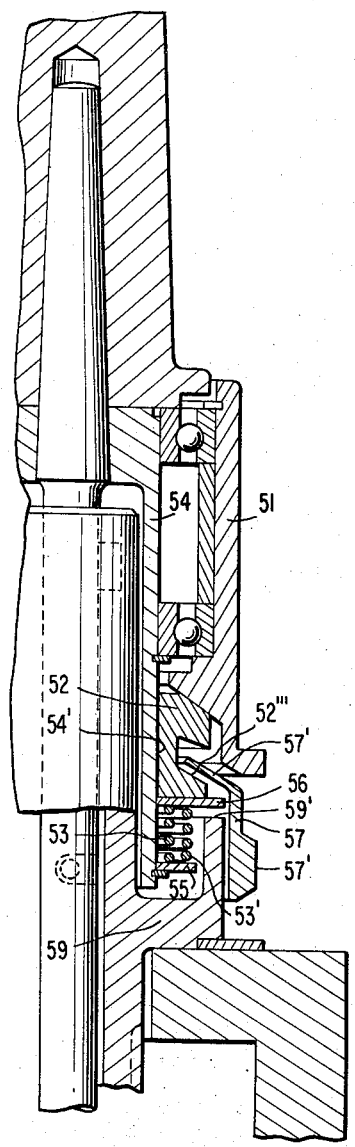

FIGURES 3 and 3a illustrates another modification of the invention which is especially suitable for heavy spindles and provided with two compression springs 53 and 53' surrounding each other which are supported at their lower ends on the ring 55 and act with their upper ends upon a ring 56 which supports the segments of the clutch element 52. This supporting ring 56 has such a large diameter that, when the clutch element 52 is depressed, ring 56 will engage upon the annular brake surface 59' which is provided on the spindle housing 59 and may, if desired, also be covered with a brake lining, as shown at FIGURE 3a. The radial force components resulting from the action between the conical part 57' of slidable sleeve 57 and the conical part 52''' of the clutch element 52 are thereby increased in strength and they are no longer dependent upon the force of springs 53 and 53'. Consequently, when sleeve 57 is being depressed, at first a mild braking action will occur which will then become very strong and may even be further intensified if, as shown at FIGURE 3, the supporting ring 56 is provided with a conical surface 56'' and the associated brake surface 59'' is made of a corresponding conical shape. The braking action occurs in a similar manner as in the embodiment according to FIGURE 1, namely, at first only between the cylindrical surface 54' of the fixed wharve member 54 and the cylindrical inner surfaces of the segments forming the clutch element 52, and thereafter also between the brake surfaces 59' as shown at FIGURE 3a or 59'' as shown at FIGURE 3. The segments of the clutch element 52 are prevented from being pushed together by providing the supporting ring 56 with projections 56' which extend into the gaps between the segments. Sleeve 57 which in this case has a reinforcing wall portion 57'' is moved similarly as the corresponding sleeve in FIGURE 1 by means of one or a pair of pins 581 which are acted upon by a lever 58, as indicated in FIGURE 3 only diagrammatically, which is pivotably mounted on a pivot pin 582 on a bracket plate 583 and is adapted to be pivoted in the direction as shown by the arrow by any suitable control means either by hand, by foot, or by knee action in order to apply the brake. Bracket plate 583 may be rigidly secured to the spindle housing 59, for example, by being soldered or welded thereto. These control means may also be provided similarly as described with reference to FIGURE 1 with adjustable stops and overload-protecting means which insure that in the operative position the slidable sleeve 57 will not engage with the rotating parts and that an excessive load will not be applied upon the brake.

According to the further modification of the invention, as illustrated in FIGURE 4, the spindle shaft 61 is provided underneath its part 62 which carries the ball bearings 63 for the loose wharve 68 with another part 64 of a larger diameter which forms a cylindrical clutch surface and serves as a fixed wharve. This shaft part 64 carries the radially movable segments of the clutch element 65 which are pressed by the spring 66 via the washer 66' against the conical inner surface 67 of the loose wharve 68. Sleeve 69 serves for disengaging the clutch and also for exerting a brake action upon the spindle shaft. When sleeve 69 is moved downwardly by suitable means which are only partly indicated by the numeral 610, the conical inner surface of the upper end 69' of the sleeve engages upon the clutch segments 65 and disconnects these segments from the conical part 67 of the loose wharve 68. The contact pressure with which the conical inner surface 69' of sleeve 69 is applied upon the corresponding conical outer surfaces 65' of the clutch segments then results in radially acting pressure components which press the segments 65 against the outer surface of the shaft part 64 and thereby exert the desired braking action upon the spindle.

According to the further embodiment of the invention as shown in FIGURE 5, the smooth part 82' of the spindle shaft carries at least one roller bearing 83 on which the loose wharve 88 is mounted in such a manner that the tension of the driving belt 88' is applied approximately centrally of the bearing. Above the roller bearing 83, a flanged ring 86' which supports the spring 86 is secured to the shaft part 84. Spring 86 possesses the segments forming the clutch element 85 upwardly against the inner conical surface 87 of the loose wharve 88. When the clutch is to be disengaged and the spindle is to be stopped, the bifurcated lever 90 which is pivotably mounted on a bracket 91 is pivoted downwardly by suitable means, not shown, and thereby depresses a ring 89 together with the clutch element 85 against the action of spring 86 so that at first the clutch element 85 is disengaged from the conical surface of wharve 88 and immediately thereafter the lower end surface 85' of the clutch element 85 is pressed upon the upper surface of ring 86' so that a braking force is thus exerted upon the spindle. Instead of exerting the braking force by pressing the bifurcated lever 90 upon the ring 89 and the clutch element 85 and by thus pressing the latter upon the surface 86'' of the ring 86' which rotates with the spindle shaft, it is also possible to provide a stationary brake surface, for example, a surface 91' on the bracket 91, as indicated in dotted lines in FIGURE 5, so that by the pressure of the bifurcated lever 90 the pressure ring 89 on the clutch element 85 will be pressed against this stationary brake surface 91. In this case it would be advisable to connect the pressure ring 89 to the spindle shaft 84 so as to be axially slidable thereon but to be nonrotatable relative thereto, for example, by a slidable spline, not shown.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. In combination with the shaft of a spindle for a textile machine, antifriction bearing means mounted on said shaft, a wharve rotatably mounted on said bearing means and adapted to be driven, a clutch element on said shaft and yieldable in radial directions, a clutch member rigidly secured to said shaft, said clutch element being located between said wharve and said clutch member, spring means acting in one axial direction of said shaft upon said clutch element, said clutch element tending to clamp said wharve and said clutch member together by being wedged between them, and means for moving said clutch element in the opposite axial direction for disconnecting said wharve from said clutch member on said shaft.

2. A combination as defined in claim 1, in which said clutch element consists of a resilient material.

3. A combination as defined in claim 1, in which said clutch element consists of a slotted ring of a resilient material.

4. A combination as defined in claim 1, in which said clutch element consists of at least three radially movable clutch segments.

5. A combination as defined in claim 4, further comprising an annular member on said shaft intermediate said spring means and said clutch element, said annular member having projections adapted to maintain said segments in their proper positions relative to each other.

6. A combination as defined in claim 1, in which said clutch element has a conical outer clutch surface and a cylindrical inner clutch surface for clamping said wharve together with said clutch member on said shaft.

7. A combination as defined in claim 1, in which said clutch element has a cylindrical outer clutch surface and a conical inner clutch surface for clamping said wharve together with said clutch member on said shaft.

8. A combination as defined in claim 1, in which said spring means consists of at least one compression spring mounted underneath said clutch element on said clutch member.

9. A combination as defined in claim 1, in which said means for moving said clutch element comprise a sleeve member movable in the axial direction of said shaft and adapted to engage with and to act upon said clutch element so as to disengage said wharve from said clutch member on said spindle shaft, the force of said spring means then being adapted to produce a frictional engagement through said clutch element between said sleeve and said shaft so as to exert a braking action upon said shaft.

10. A combination as defined in claim 9, in which said clutch element and said sleeve have corresponding conical surfaces which, when said sleeve is moved so as to exert said braking action upon said shaft, engage with each other so as to press said clutch element against said clutch member on said shaft.

11. A combination as defined in claim 9, in which said means for moving said clutch element further comprise control means for moving said sleeve, adjustable stop means for adjusting the position of said sleeve, and resilient means operatively associated with said control means and serving as an overload protection.

12. A combination as defined in claim 1, in which said clutch member forms an integral part of said spindle shaft.

13. A combination as defined in claim 1, in which said clutch member forms an integral part of said spindle shaft and is located above said bearing means for said wharve.

References Cited

UNITED STATES PATENTS

| | | | |
|---|---|---|---|
| 2,975,584 | 3/1961 | Makant et al. | 57—88 |
| 3,166,883 | 1/1965 | Meadows | 57—88 |

FOREIGN PATENTS 1,313,693   11/1962   France.

WILLIAM S. BURDEN, *Primary Examiner.*